Oct. 2, 1928.
J. C. SHOFNER
1,685,869
AUTOMOBILE HEADLIGHT STRUCTURE
Filed Feb. 25, 1927    2 Sheets-Sheet 2
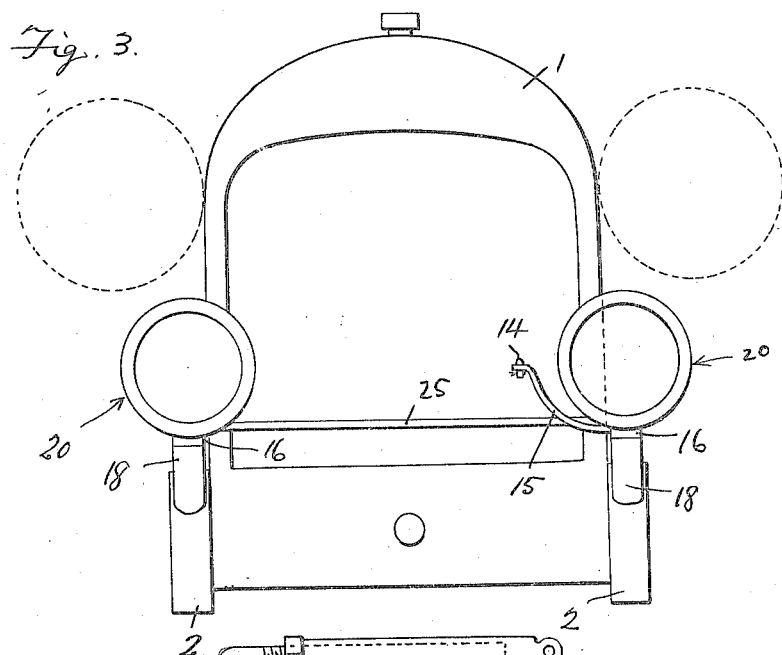
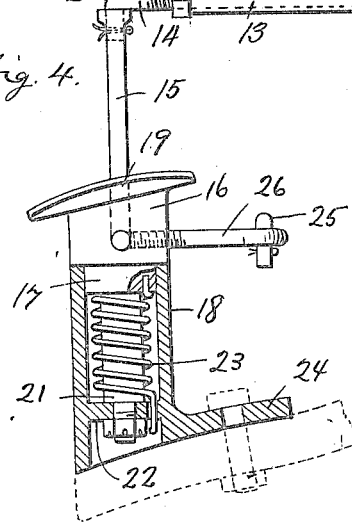
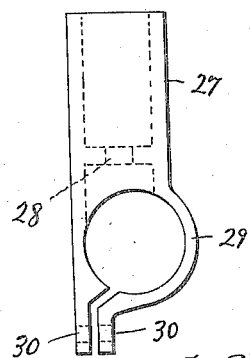
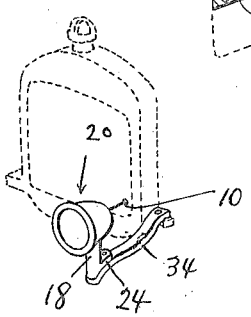
Inventor
Joseph Cecil Shofner
By Clarence A. O'Brien
Attorney Patented Oct. 2, 1928.

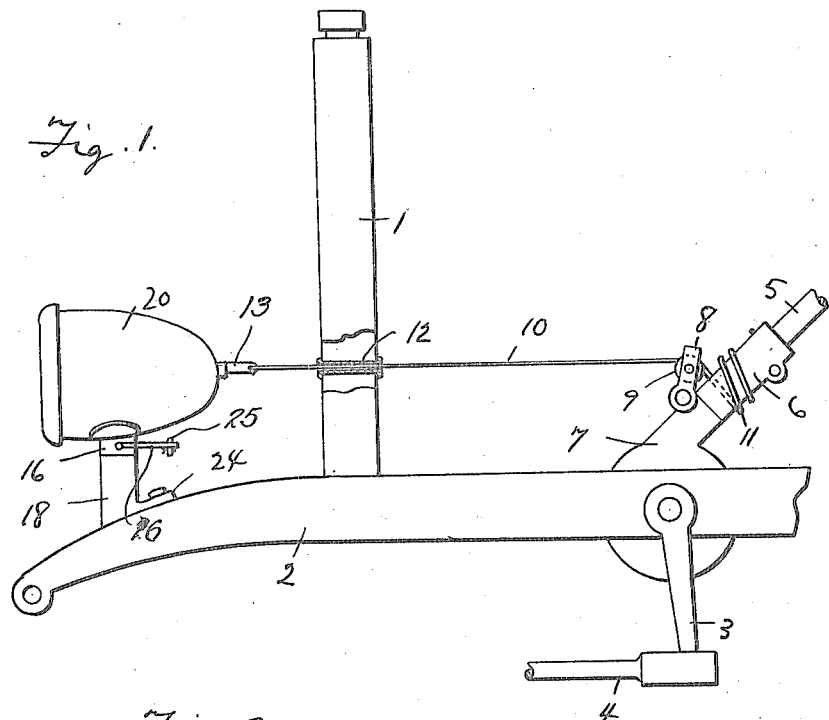
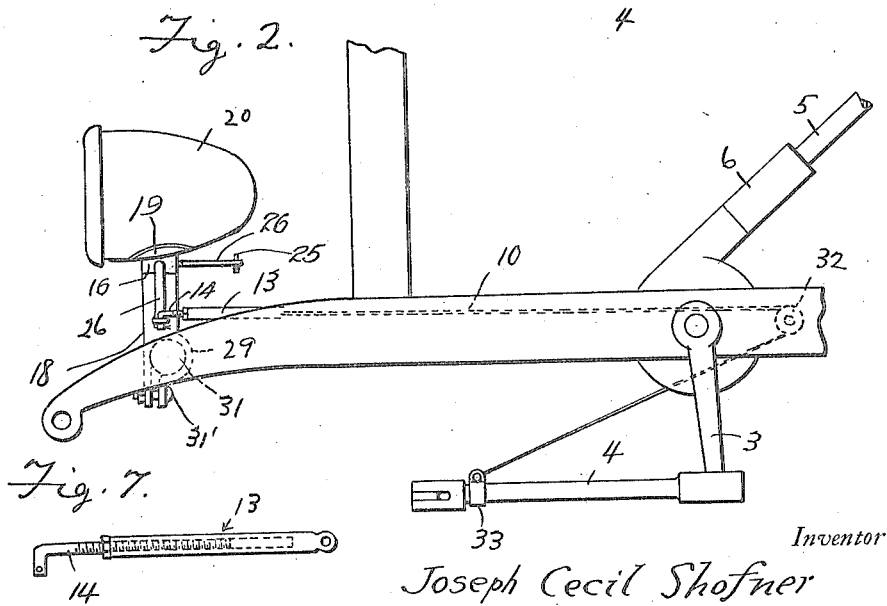

1,685,869

UNITED STATES PATENT OFFICE.

JOSEPH CECIL SHOFNER, OF HALEY, TENNESSEE.

AUTOMOBILE HEADLIGHT STRUCTURE.

Application filed February 25, 1927. Serial No. 171,046.

The present invention is directed to improvements in automobile headlight structures, and it has more particular reference to auxiliary lights which are adapted to be used in conjunction with the usual main stationary headlights, the auxiliary lights in the present instance, being mounted to turn with the front wheels, whereby to cause the light beams to illuminate the path of travel of the vehicle.

More specifically, what I propose is an auxiliary light structure which embodies two comparatively small lights which are mounted on a plane beneath the main headlights and which are mounted for rotation about vertical axes and connected together to simultaneously operate, in order to illuminate the road surface ahead of the automobile in an efficient manner to promote safe driving.

The particular structural details forming the alleged novelty, together with the advantages which accompany the same, will become more readily apparent from the following description and drawings.

In the accompanying drawing forming a part of this application, and in which like numerals are employed to designate like parts throughout the same:—

Figure 1 is a side elevation showing one embodiment of the invention.

Fig. 2 is a similar view showing a different embodiment of the invention.

Fig. 3 is a front elevation, showing the relationship of the auxiliary lights to the main lights.

Fig. 4 is a fragmentary sectional view of the type of light shown in Fig. 1.

Fig. 5 is a side elevation showing the form of standards used in the embodiment represented in Fig. 2.

Fig. 6 is a perspective of another modification hereinafter explicitly referred to.

Fig. 7 is a side elevation of one of the details.

Attention is first directed to Figs. 1, 3 and 4, wherein it will be seen that the reference character 1 designates an automobile radiator and the reference character 2 the side frame bars. The reference characters 3 and 4, represent portions of the steering gear, and the reference character 5 designates the rotary portion of the steering rod which in the present instance carries a sleeve 6 which is fastened thereon in any suitable manner.

Mounted just below this sleeve 6 on the part 7 is a yoke 8 carrying a small pulley 9 over which an operating cord or cable 10 passes, this cord being wrapped around the sleeve as at 11. This cord extends forwardly through a guide conduit 12, carried by the radiator, and connects with an extensible operating member 13 (see Fig. 7). The member has a downturned hooked portion 14 connected with an eye on a longitudinally curved crank arm 15, as shown in Fig. 3.

The crank arm 15 is carried by a rotary head 16 on the upper end of a shaft 17 which is mounted for rotation in a hollow standard 18. On the upper end of this shaft is a suitably shaped fitting 19 which is connected with the under side of the auxiliary casing 20. The auxiliary light is the same in each instance, and a description of one will suffice for both.

The shaft 17 is provided with a reduced lower portion 21 terminating in a screw threaded shank and this extends through a web or partition 22 on the interior of the standard 18. A coiled spring 23 is fastened at one end in the partition 22, and at its opposite end to the upper portion of the shaft 17, and surrounds the portion 21 of the shaft.

An attaching ear 24 is formed integral with the lower end of the standard and is adapted to be mounted on the adjacent chassis bar 2. In order that these auxiliary lights may operate together, I provide a connecting rod 25 which has its downturned opposite ends connected with the eyes on the rear ends of the bolts 26 carried by the rotary heads 16.

It is only necessary with this arrangement to provide a single crank arm 15 and operating cord therefor. When the steering wheel (not shown) is rotated, the rod 5 will also be rotated. This will rotate the sleeve 6 and inasmuch as the cord 10 is wrapped thereon, the cord will be wound upon the sleeve so that the sleeve will operate as a drum.

When the light 20 is directed straight ahead the spring 23 is under tension and has a tendency when the light is released to turn said light toward the left. The cable serves normally to hold the light against turning in the direction indicated. When, however, the rod 5 is turned to direct the forward wheels of the automobile toward the left, the cable will be let off the sleeve 6 to permit of the described turning of the light under the action of its respective spring 23.

The longitudinal guide conduit 12 carried in and by the lower portion of the radiator 1 prevents bouncing or any other lateral deflection of the cable 10 when the automobile is traversing a rough road, and in that way assures movement of the light in concert with the turning of the rod 5. Said conduit 12 also contributes materially to the simplicity of the organized mechanism inasmuch as it permits direct and straight rearward passage of the cable from the light crank 15 to the steering mechanism.

The only distinction between the form of the invention described and the form represented in Figs. 2 and 5, is that the standard and attaching means are changed. The standard is provided with an apertured partition 28 and at its bottom with a ring-like attaching means 29 having lugs 30 for a clamping bolt 31'.

Obviously by binding these lugs together, the ring-like means 30 can be tightly bound or clamped about the cross rod 31. The standards 18 in Figure 2 are mounted on said cross rod 31. The cable 10, as shown in Fig. 2 is trained over a small pulley 32 carried by the chassis bar, and there is a clamp or clip 33 on the end of this cable which connects to the arm 4 of the steering gear. The operation with this form of the invention is however the same as already described.

A still further embodiment of the invention is shown in Fig. 6 wherein all of the details of the auxiliary headlights and the operating means are the same as before described. The only distinction here is that a special attaching bracket or bar 34 is fastened to the radiator in the manner shown.

My novel headlights serve in conjunction with the main lights, but cast a smaller beam which is concentrated toward the center of the machine, and is likewise projected on that portion of the path of travel directly in advance of the center of the machine. These auxiliary lights are particularly advantageous in that they are disposed on a low plane so as not to confuse driver of a machine approaching in an opposite direction.

The auxiliary lights are exceptionally efficient in that they follow the direction of movement of the front wheels, and aid in driving on unsafe roads. In practice, a separate electric switch (not shown), is provided on the instrument board, so that these lights can be controlled at will.

Minor changes coming within the field of invention claimed may be resorted to if desired.

Having thus described my invention, what I claim as new is:—

In an automobile, the combination of a frame, a radiator having a longitudinally disposed conduit guide extending through its lower portion, a steering mechanism in rear of said radiator, a light mounted on the frame to be turned from a straight-ahead position to a laterally directed position, a tensioned spring connected with the frame and the light and arranged on release of the light to turn the same to a laterally-directed position, a crank connected with the light, and a flexible cable movable through the conduit guide in the radiator and directly interposed between and connected to said crank and said steering mechanism, whereby when the steering mechanism is actuated and forward movement of said cable is permitted said spring will operate to move the light to a laterally directed position.

In testimony whereof I affix my signature.

JOSEPH CECIL SHOFNER.